(12) United States Patent
Yoneyama

(10) Patent No.: US 9,211,722 B2
(45) Date of Patent: Dec. 15, 2015

(54) RECORDING APPARATUS

(71) Applicant: CANON KABUSHIKI KAISHA, Tokyo (JP)

(72) Inventor: Hiromasa Yoneyama, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/682,648

(22) Filed: Nov. 20, 2012

(65) Prior Publication Data

US 2013/0147872 A1    Jun. 13, 2013

(30) Foreign Application Priority Data

Nov. 25, 2011    (JP) ................................. 2011-257430

(51) Int. Cl.
*B41J 2/205*    (2006.01)
*H04N 1/60*    (2006.01)

(52) U.S. Cl.
CPC ............... *B41J 2/205* (2013.01); *H04N 1/6033* (2013.01); *H04N 1/6044* (2013.01)

(58) Field of Classification Search
CPC ............................. B41H 2/205; H04N 1/6044
USPC .......................................................... 347/19
See application file for complete search history.

(56) References Cited

U.S. PATENT DOCUMENTS

| | | | |
|---|---|---|---|
| 3,612,753 A * | 10/1971 | Korman ......................... | 358/534 |
| 6,300,968 B1 * | 10/2001 | Kerxhalli et al. ............. | 347/116 |
| 6,567,170 B2 * | 5/2003 | Tandon et al. ................ | 356/406 |
| 2005/0078137 A1 * | 4/2005 | Juan et al. ...................... | 347/19 |
| 2007/0291291 A1 * | 12/2007 | Vilar et al. ..................... | 358/1.9 |

FOREIGN PATENT DOCUMENTS

| JP | 2006-305952 A | 11/2006 |
|---|---|---|
| JP | 2008-290268 A | 12/2008 |
| JP | 2011-026045 A | 2/2011 |

* cited by examiner

*Primary Examiner* — Stephen Meier
*Assistant Examiner* — Alexander D Shenderov
(74) *Attorney, Agent, or Firm* — Canon USA, Inc. I.P. Division

(57) ABSTRACT

A method includes providing a sheet on which a color patch to be subjected to colorimetric measurement by a colorimetric unit and a pattern corresponding to the color patch and used for obtaining a distance from a portion where the pattern is read to a portion where the colorimetric measurement of the color patch is performed when the colorimetric unit reads the pattern are recorded, obtaining the distance from the portion where the pattern is read to the portion where the colorimetric measurement of the color patch is performed by reading the pattern on the sheet by the colorimetric unit, moving the sheet based on the obtained distance, and performing colorimetric measurement on the color patch by the colorimetric unit.

10 Claims, 17 Drawing Sheets

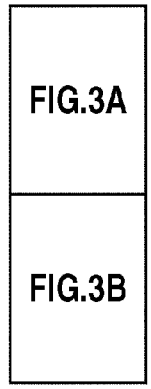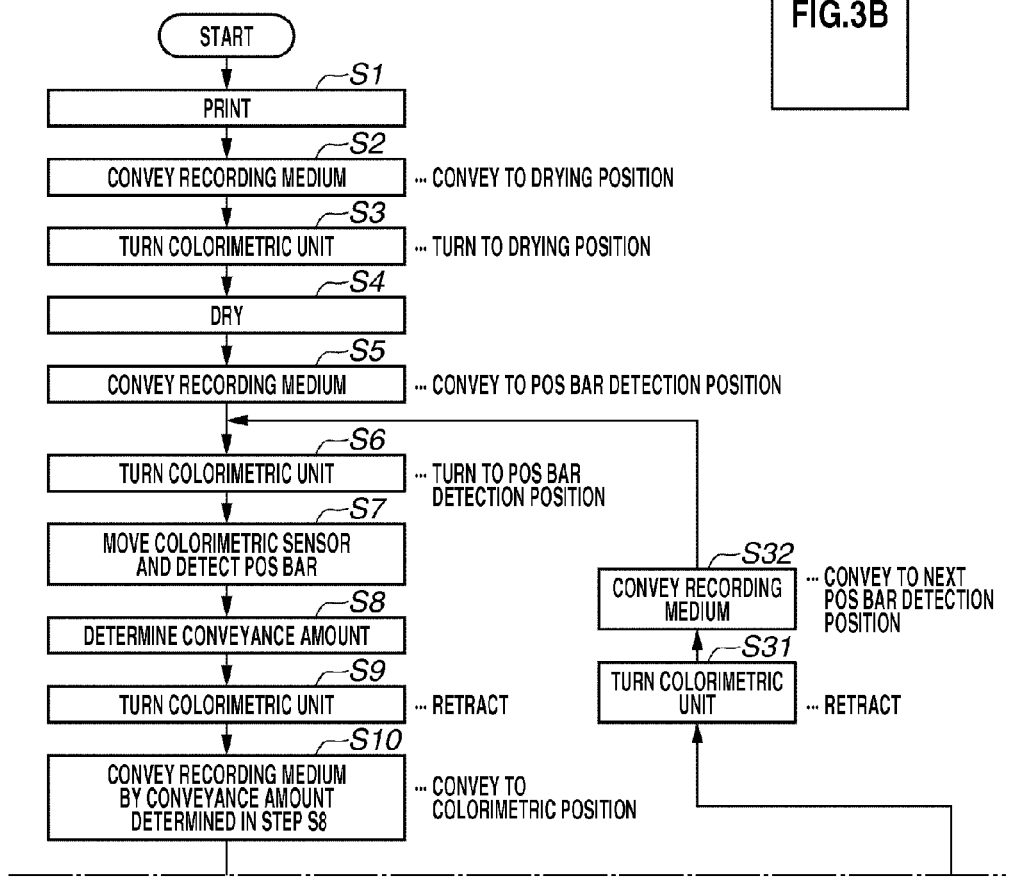

FIG.5A
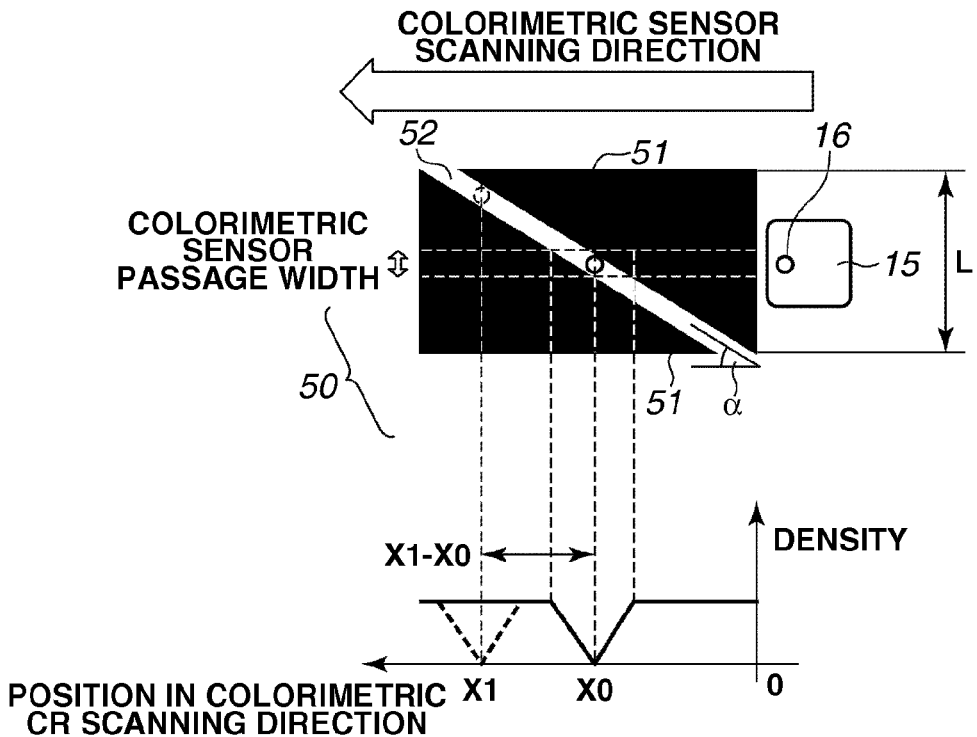
FIG.5B
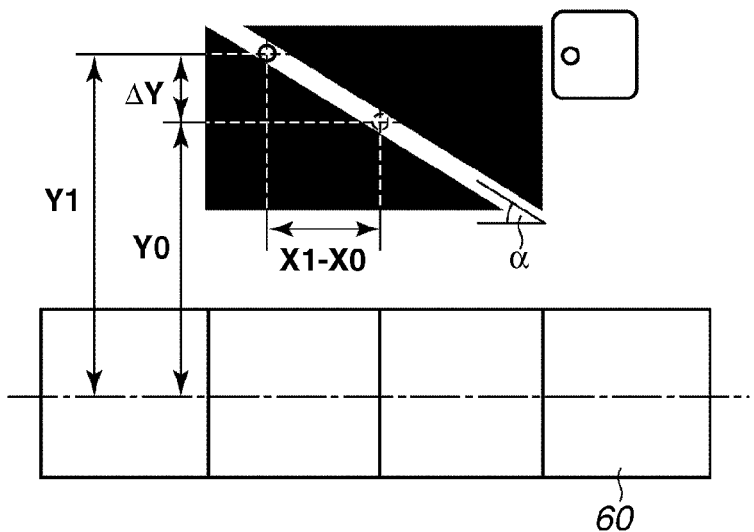
FIG.5C
$\Delta Y = (X1-X0) \times \tan\alpha$

CONVEYANCE
DIRECTION IN
COLORIMETRIC
MEASUREMENT

RECORDING APPARATUS

BACKGROUND OF THE INVENTION

1. Field of the Invention

The present invention relates to a recording apparatus including a colorimeter.

2. Description of the Related Art

Inkjet printers are one of recording apparatuses, and some inkjet printers are provided with a colorimetric function. Such an inkjet printer performs colorimetric measurement on a recorded color image for color calibration or the like. Further, based on the colorimetric data, the printer reflects the result in next image recording and obtains desired color reproduction.

Generally, color data is expressed as color patches of each color arranged in grid-like manner. In the general colorimetric measurement process, the recorded color patches are dried, the colorimetric sensor moves in the recording medium width direction to perform colorimetric measurement on the rows of the color patches are subjected to one by one, and then the measured recording medium is discharged.

In the process, one of the most important points is to accurately stop the unit patch at a colorimetric position of the colorimeter. This is because the measurement at an unexpected position is a main factor in causing colorimetric errors. In the known techniques, the color patches are not always stopped at an expected position due to errors such as slips in the conveyance system, and as a result, in many cases, the colorimetric measurement is not appropriately performed.

In Japanese Patent Application Laid-Open No. 2008-290268, first, a feed amount determination patch is recorded on a recording medium. Then, colorimetric measurement is performed on the feed amount determination patch to calculate an error when the feed amount determination patch is conveyed by a set feed amount for conveying to a colorimetric position. In a main measurement, the set feed amount corrected by the calculated error as a correction value is used.

In the technique discussed in Japanese Patent Application Laid-Open No. 2008-290268, the correction value is calculated for each paper type. Consequently, conveyance errors due to an environment and the paper type can be corrected. However, in reality, if the recording media of the same type are used, conveyance errors are generated depending on differences in diameters of rolls (curl amounts), chart lengths, print Duties, and the like, and displacement may be caused at the time of pressing.

In addition, in a case where a patch group is long in the conveyance direction or switching between forward feed and back feed occurs due to a layout of a plurality of patches, conveyance errors may be accumulated and hinder accurate conveyance of a color patch for colorimetric measurement to the reading position. In such a case, there is a possibility that reading of the color patch arrays is skipped, and appropriate colorimetric measurement may not be performed. To prevent such an issue, the size of the patch may be increased in the conveyance direction. However, this causes increase in the usage of paper and decrease in the throughput due to the increase in the conveyance distance.

SUMMARY OF THE INVENTION

The present invention is directed to a colorimetric method for calculating a position of a color patch for colorimetric measurement with a high degree of accuracy.

According to an aspect of the present invention, a method includes providing a sheet on which a color patch to be subjected to colorimetric measurement by a colorimetric unit and a pattern corresponding to the color patch and used for obtaining a distance from a portion where the pattern is read to a portion where the colorimetric measurement of the color patch is performed when the colorimetric unit reads the pattern are recorded, obtaining the distance from the portion where the pattern is read to the portion where the colorimetric measurement of the color patch is performed by reading the pattern on the sheet by the colorimetric unit, moving the sheet based on the obtained distance, and performing colorimetric measurement on the color patch by the colorimetric unit.

According to exemplary embodiments of the present invention, a position of a color patch for colorimetric measurement can be calculated with a high degree of accuracy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5C illustrate enlarged views of a positioning (POS) bar and corresponding detection result graphs.

DESCRIPTION OF THE EMBODIMENTS

Figure 1:
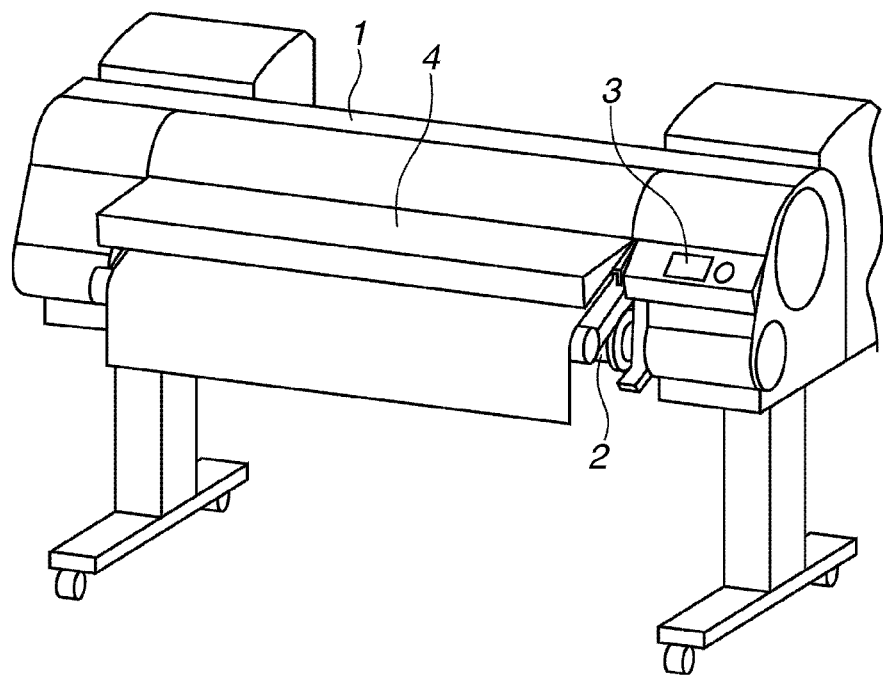
FIG. 1 is a perspective view illustrating a printer according to an exemplary embodiment of the present invention.

Various exemplary embodiments, features, and aspects of the invention will be described in detail below with reference to the drawings.

The components described in the exemplary embodiments are only examples, and the scope of the present invention is not limited to the examples. The same reference numerals in the drawings indicate similar or corresponding portions.

FIG. 1 is a perspective view illustrating an inkjet recording apparatus (hereinafter, referred to as "printer") 1 according to the exemplary embodiment of the present invention, the apparatus is viewed from the front. To the apparatus, roll paper 2 as a recording medium is set. The printer includes an operation unit 3 used to operate the printer. Using various types of switches and the like provided to the operation unit 3, a user can specify a width of the roll paper 2, online/offline, a command, and the like. On an upper portion of the front of the printer, a colorimetric unit 4 for performing colorimetric measurement on a color patch for colorimetric measurement recorded on a recording medium is provided.

Figure 2:
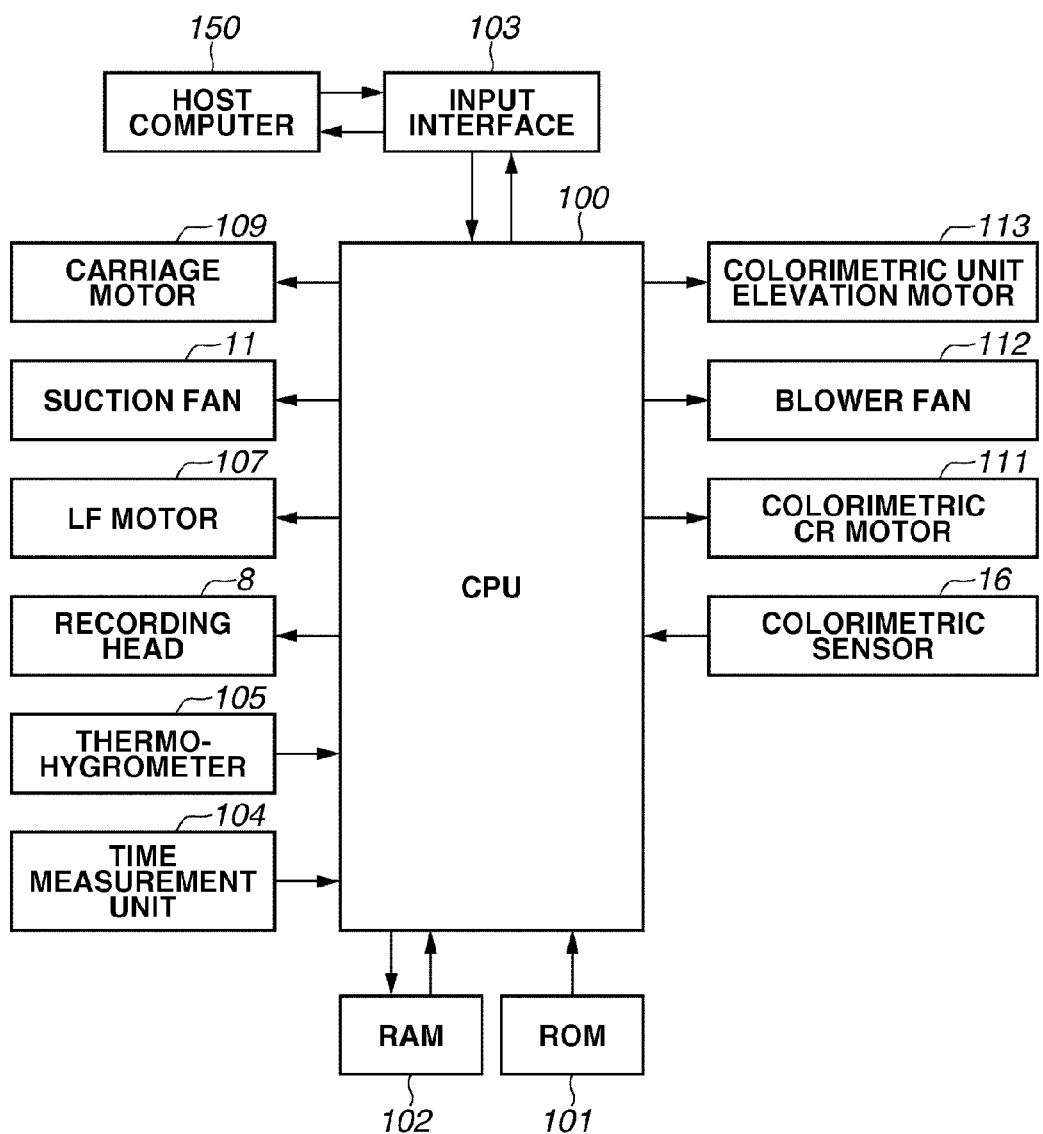
FIG. 2 is a control block diagram.
Figure 3B:
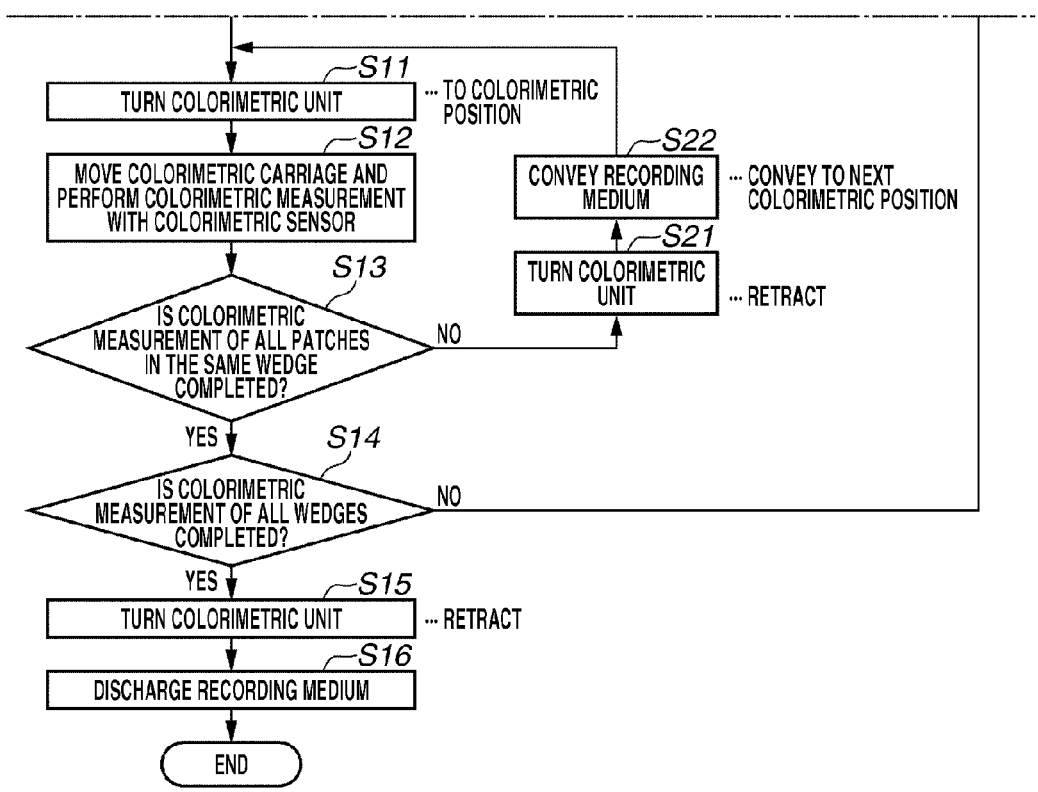
FIG. 3 (including FIGS. 3A and 3B) is a flowchart illustrating a control operation.
Figure 4A:
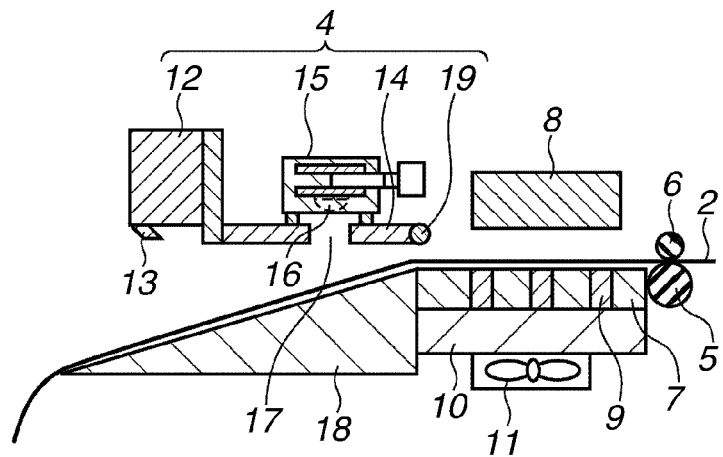
FIGS. 4A to 4C illustrate side cross-sectional views of main components of the printer in FIG. 1.
Figure 4B:
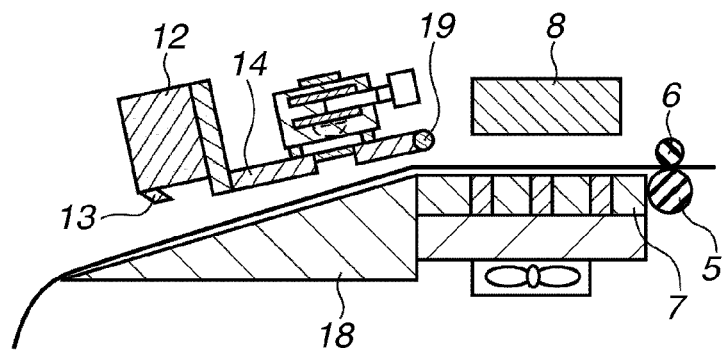
Figure 4C:
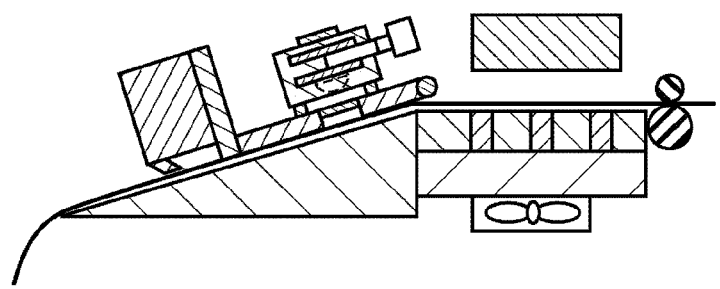

A configuration of the printer, a series of operations of printing, colorimetric measurement, and sheet discharge is described. FIG. 2 is a control block diagram illustrating a configuration of a control system according to a first exemplary embodiment of the present invention. FIG. 3 (including FIGS. 3A and 3B) is a flowchart illustrating a control operation. FIGS. 4A to 4C illustrate cross-sectional views of main components of the printer 1.

FIG. 4A is the cross-sectional view of the main components of the printer in FIG. 1, and FIG. 4A illustrates a state at the time of printing. The recording medium 2 that is a sheet is conveyed into the printer 1. The recording medium 2 is held between a conveyance roller 5 and a pinch roller 6 that function as a conveyance unit, conveyed by the conveyance roller 5 driven by a line feed (LF) motor, and reaches on a platen 7. A recording head 8 for discharging ink, which functions as an image forming unit or a recording unit, is disposed at a position to face the surface of the platen 7. On the platen 7, many suction holes 9 are formed to suck the recording medium onto the platen 7 to prevent the recording medium from floating. Under the platen 7, a duct 10 communicating with the platen 7 is disposed. Under the duct 10, a suction fan 11 that communicates with the duct 10 and sucks the recording medium onto the platen 7 is disposed. To a portion corresponding to an image forming area of the recording medium placed on the platen 7, ink is discharged from the recording head 8 based on image information, and a positioning (POS) bar and a color patch for colorimetric measurement are recorded. In a downstream of the recording head 8, a pressing plate 14 including a slit portion 17 is provided.

The colorimetric unit 4 includes the pressing plate 14 for pressing the recording medium 2 onto a sheet discharge guide 18, a colorimetric carriage 15, and a drying unit 12. The entire colorimetric unit 4 is rotatably supported around a colorimetric unit rotation shaft 19. In FIG. 4A, the colorimetric unit 4 is positioned at a standby position separated from the sheet discharge guide 18.

In FIG. 4B, the colorimetric unit 4 is turned around the colorimetric unit rotation shaft 19 in a counterclockwise direction and positioned at a blowing position with a space between the sheet discharge guide 18. At the blowing position, the drying unit 12 including a blower fan and a heater blows warm air through a drying duct 13 toward upstream in the conveyance direction of the recording medium to dry a color patch 60 on the recording medium.

FIG. 4C illustrates a state at the time of colorimetric measurement. After the color patch is dried, the colorimetric unit 4 is further turned around the colorimetric unit rotation shaft 19 in the counterclockwise direction, and moved to a colorimetric position at which the pressing plate 14 presses the recording medium onto the sheet discharge guide 18. At the colorimetric position, the colorimetric carriage 15 moves to scan the recording medium in a width direction thereof and a colorimetric sensor 16 provided to the colorimetric carriage 15 performs the colorimetric measurement from the slit portion 17 provided on the pressing plate 14.

The control block diagram in FIG. 2 is described. A central processing unit (CPU) 100 performs overall control of the recording, drying, and colorimetric measurement according to a control program stored in a read-only memory (ROM) 101. To the CPU 100, record data, record mode setting information, and the like are input from a host computer 150 via an input interface 103. The CPU 100 may write record data in a random access memory (RAM) 102 or read the data therefrom. The CPU 100 obtains the record data and the record mode information from the host computer 150, time information from a time measurement unit 104 for measuring elapsed time after the recording completion, temperature and humidity information of the inside of the printer from a thermohygrometer 105, and colorimetric data from the colorimetric sensor 16.

An LF motor 107 drives the conveyance roller 5 for conveying a recording medium. A carriage motor 109 moves the recording head 8 to scan the recording medium in a direction intersecting with the conveyance direction thereof. A colorimetric carriage motor 111 moves the colorimetric carriage. A blower fan 112 blows air from the drying unit 12. A colorimetric unit elevation motor 113 turns the colorimetric unit 4 around the colorimetric unit rotation shaft 19.

Based on the obtained data, the CPU 100 performs control of the recording head 8, the LF motor 107, the carriage motor 109, the colorimetric carriage motor 111, the blower fan 112, and the colorimetric unit elevation motor 113. The host computer 150 transfers record data, record mode setting information, or the like to the recording apparatus 1, and the CPU 100 determines record control according to the setting information in the record mode, and starts the recording.

The control operation is described with reference to the flowchart in FIG. 3. When the image forming apparatus records a color patch on a recording medium with the recording head 8, as illustrated in FIG. 4A, the colorimetric unit 4 stands by at the standby position separated above from the sheet discharge guide 18. In step S1, in such a state, while the recording medium is conveyed in the conveyance direction by the drive of the conveyance roller 5, the recording head 8 records position information patterns, that is, a positioning bar (POS bar) 50 and a color patch 60. In this process, if a curl at an leading edge of the recording medium is large or stiffness is high and the recording medium is conveyed while floating from the sheet discharge guide 18, since the height of the colorimetric unit 4 at the standby position is high, the surface of the recording medium does not contact with the colorimetric unit 4. With the structure, damage on a print surface can be prevented.

The reading is performed while the recording medium is pressed, and consequently, the recording medium cannot be conveyed in the pressed state. Consequently, the present exemplary embodiment provides a system which can detect a stop position deviation in one scanning operation.

Figure 6:
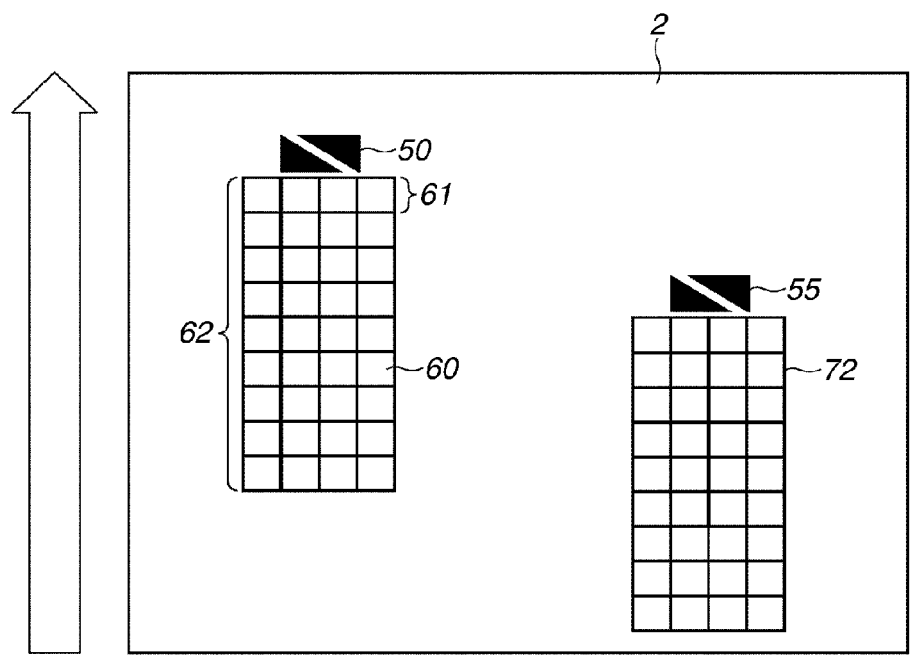
FIG. 6 illustrates a layout of POS bars and color patches.

As illustrated in FIG. 6, the color patches 60 are recorded to form a color patch array 61 aligned in the width direction of the recording medium 2. Further, a plurality of color patch arrays 61 are recorded such that the rows are aligned in the conveyance direction of the recording medium 2. A first colorimetric measurement is performed on the color patch array 61 recorded at the most upstream position, and the colorimetric measurement is sequentially performed on the color patch arrays toward the downstream side.

In step S2, to dry the color patch array 61 which is recorded at the most upstream position and on which the colorimetric measurement is performed first, the conveyance roller 5 conveys the recording medium such that the portion of the color patch array 61 is positioned in the drying area where the warm air is blown from the drying duct 13. At the same time, in step S3, the colorimetric unit 4 is turned and lowered to move to the drying position.

In step S4, the air is blown from the drying duct 13 of the drying unit 12 to dry the color patch arrays. In this process, a distance between the drying duct 13 and the surface of the recording medium is narrowed to send a high-speed drying wind to the color patches 60 to reduce the drying time.

Then in step S5, the recording medium 2 is conveyed until the POS bar 50 recorded on the recording medium 2 positions at a detection area of the colorimetric sensor 16. In step S6, the colorimetric unit 4 is further turned to the colorimetric position to press the surface of the recording medium with the pressing plate 14.

The pressing operation smoothes the curl of the recording medium 2, and consequently, an error tends to occur in the conveyance direction. In such a state, in step S7, the colorimetric carriage 15 is moved in the width direction of the recording medium to detect a density of the POS bar 50 with the colorimetric sensor 16 from the slit portion 17 provided to the pressing plate 14. The process in step S7 is performed to calculate a position where the density of the POS bar 50 is the lowest in the scanning direction of the colorimetric carriage. According to the calculation of the lowest density position of the POS bar 50, how much an actual stop position is deviated from an ideal stop position of the recording medium 2 for the detection of the POS bar 50 can be calculated by a method described below. In step S8, based on the calculated stop position deviation, a conveyance distance for positioning the first color patch array 61 at the detection area in a next conveyance, is calculated.

Prior to the next conveyance, in step S9, to prevent the recording medium surface from contacting the colorimetric unit 4, the colorimetric unit 4 is retracted to the upper drying position. In step S10, the recording medium 2 is conveyed by the conveyance distance calculated in step S8 to convey the first color patch array 61 to the detection area.

In step S11, the colorimetric unit 4 is turned to press the recording medium from the front surface with the pressing plate 14. In step S12, similarly to the detection of the POS bar 50, the colorimetric carriage 15 moves in the recording medium width direction and scans the color patch array 61 to perform colorimetric measurement thereon.

In step S13, in a case where a plurality of arrays of the color patches 60 is provided, and if the CPU 100 determines that there is a color patch array to be measured next (NO in step S13), the process proceeds to step S21. In step S 21, the colorimetric unit 4 is retracted upward. In step S22, the next color patch array 61 is conveyed to the colorimetric position, and the process returns to step S11. In step S12, the colorimetric unit 4 is turned to press the recording medium, and colorimetric measurement is performed. These processes are repeated until the colorimetric measurement is completed for all color patch arrays in a color patch group (wedge) 62.

In a case where a plurality of color patch groups (wedges) which are groups of the color patches 60 are recorded on the recording medium, after the colorimetric measurement is completed for all color patch arrays 61 within the same wedge 62, the wedge 62 is switched to another wedge, and the measurement is to be performed again. In such a case, in step S31, the colorimetric unit 4 is retracted upward. In step S32, the recording medium 2 is conveyed to the detection position of the next POS bar 50. Then in step S6, the colorimetric unit 4 is turned to press the recording medium. In step S7, the density of the POS bar 50 is detected.

In this process, if the next POS bar 50 is located at the upstream side in the conveyance direction at the time of colorimetric measurement (a direction opposite to the conveyance direction at the time of recording), switching between forward feed and backward feed is necessary. As a result, the conveyance amount is easily changed, and this requires attention. Then, the colorimetric measurement is performed similarly to that in the previous wedge 62. If the colorimetric measurement is completed for all color patches 60 on the recording medium (YES in step S14), then in step S15, the colorimetric unit 4 is turned again to move to the standby position before the printing. In step S16, the recording medium is discharged. With the operation, the colorimetric data pieces of all color patches 60 are obtained and colorimetric information pieces are stored in the RAM.

The detection of the stop position deviation and the calculation of the conveyance distance performed in steps S7 and S8 are described below. FIGS. 5A to 5C illustrate an enlarged POS bar 50 and a graph indicating a relationship between positions in a colorimetric carriage scanning direction and densities which are obtained as results of corresponding detection. The POS bar 50 includes two regions 51 (i.e., a black print portion 51) of black right triangles of a high density and the same size. The regions 51 are arranged such that a hypotenuse of each region faces to each other and a white belt-shaped mark 52 of a low density is formed between the two hypotenuses. Consequently, the POS bar 50 has a shape with the mark of slanting white line in the black patch.

The colorimetric sensor 16 is mounted in the colorimetric carriage 15. The colorimetric sensor 16 performs scanning over the POS bar 50 by detecting densities from the right side to the left side in the drawing. The graph below the POS bar 50 is the detection result. The density of the black print portion 51 is high, and the detected density decreases as an area of the white portion increases in a spot diameter of a colorimetric light of the colorimetric sensor 16. The white line mark slants to the scanning direction of the colorimetric sensor 16 and also to the conveyance direction of the recording medium. Consequently, if the stop position of the recording medium changes in the conveyance direction, a position where the mark is detected by the colorimetric sensor 16 in the scanning direction changes.

FIG. 5A illustrates a state that the POS bar 50 is stopped at an ideal target position by the conveyance in step S5. At that time, the colorimetric sensor 16 is moved for scanning and passes over the line passing through a center position Y0 of the width of the POS bar 50 in the conveyance direction. In this movement, a position where the density in the scanning direction is the lowest is a position X0, and the position X0 is the center of the width in the scanning direction of the POS bar 50. The portion corresponding to the coordinate (X0, Y0) is a reference position of the mark.

Meanwhile, it is assumed that, in an actual conveyance, the POS bar 50 stops at a position illustrated in FIG. 5B with a deviation $\Delta Y$ with respect to the ideal target position Y0 because of a conveyance error. It is assumed that a position with the lowest density in the scanning direction when the colorimetric sensor 16 performs scanning is a position X1. The colorimetric sensor 16 passes through a portion of the coordinate (X1, Y1) with the lowest density. The deviation amount $\Delta Y$ can be calculated from a distance X1 that is a distance from the reference position of the mark to the portion with the lowest density detected by the colorimetric sensor 16 in the scanning direction and an inclination a of the mark with respect to the scanning direction using a tangent function (tangent). If an angle between the scanning direction of the colorimetric sensor 16 and the white slit portion 52 of the POS bar 50 is $\alpha$, the deviation amount $\Delta Y$ is calculated by an equation $\Delta Y=(X1-X0)\tan \alpha$.

It is assumed that, when the POS bar 50 is stropped at the ideal target position, a distance for conveying the recording medium 2 for performing the colorimetric measurement on the color patches 60 next is set to Y0. The distance Y0 is a predetermined value. In the case in FIG. 5B, the recording medium is to be conveyed by an additional distance of the deviation amount $\Delta Y$, and consequently, the conveyance distance Y1 can be calculated by an equation $Y1=Y0+\Delta Y=Y0+$ (X1−X0)tan α. Thus, the recording medium is conveyed by the distance Y1 and the color patches 60 can be stopped at the position where the colorimetric sensor 16 passes through the center of the width of the color patches 60 in the conveyance direction.

A correction range and a resolution are specified according to a length L in the conveyance direction of the POS bar and an inclination angle α. According to the present exemplary embodiment, the length L is set to a size larger than the patch size to double the correction range (the size of a correctable conveyance error) which is sufficiently wide range. Further, the angle α is set such that the resolution is to be 0.2. The slit width is set to a size larger than the spot diameter of the colorimetric sensor. To further increase the detection accuracy, the slit may be laid out in a staircase pattern such that a density difference clearly appears.

Since the recording medium is conveyed up to a position of the first color patch array 61 with the conveyance amount Y1 obtained by correcting the deviation amount, the color patch arrays 61 can be read without skipping. In addition, a usage amount of the recording medium can be reduced by reducing the color patch size to a minimum size. According to the present exemplary embodiment, the correction in the conveyance from the POS bar 50 to the first color patch array 61 is described. In addition, using the deviation amount in the conveyance direction calculated from the detection of the POS bar 50, a conveyance amount from a color patch array 61 to a next color patch array 61 can be corrected. The printer 1 according to the present exemplary embodiment may be configured to announce to a user that the user can select whether to correct the conveyance amount on display of the operation unit 3 or the like, and leave to the user a determination. Further, whether to perform the correction may be automatically determined by setting a threshold.

With reference to FIG. 6, a relationship between the POS bar and the color patch, and a colorimetric measurement procedure in free layout are described. FIG. 6 illustrates a plurality of wedges and POS bars for the respective wedges recorded on the recording medium. One POS bar is recorded for each wedge. The POS bar 50 is for the wedge 62, and the POS bar 55 is for the wedge 72. The individual POS bar is recorded at a position near the corresponding wedge at the downstream side thereof in the conveyance direction in the colorimetric measurement. With this layout, the correction in the conveyance distance to the color patch can be performed immediately before the colorimetric measurement of the color patches in each wedge. The centers of the POS bar and the color patches are aligned in the colorimetric carriage scanning directions. Accordingly, a conveyance error due to a skew of the recording medium can be optimally corrected for each wedge.

A printer including the colorimetric apparatus can freely lay out color patches or images (free layout). Consequently, as illustrated in FIG. 6, a plurality of wedges is often laid out in the width direction of the recording medium. In such a case, after colorimetric measurement of a first wedge is completed, the recording medium is conveyed in the opposite direction of the conveyance direction in the colorimetric measurement, and colorimetric measurement of a next wedge is started. In the colorimetric measurement of a wedge after the switching of the forward feed and the backward feed, a conveyance error is large and there is concern about skip in reading of a color patch array. In consideration of this issue, according to the present exemplary embodiment, the POS bars are disposed immediately before the respective wedges. Consequently, the conveyance distance correction can be performed for each wedge, and the colorimetric operation can be performed without skip in reading of the color patch array.

Figure 7:
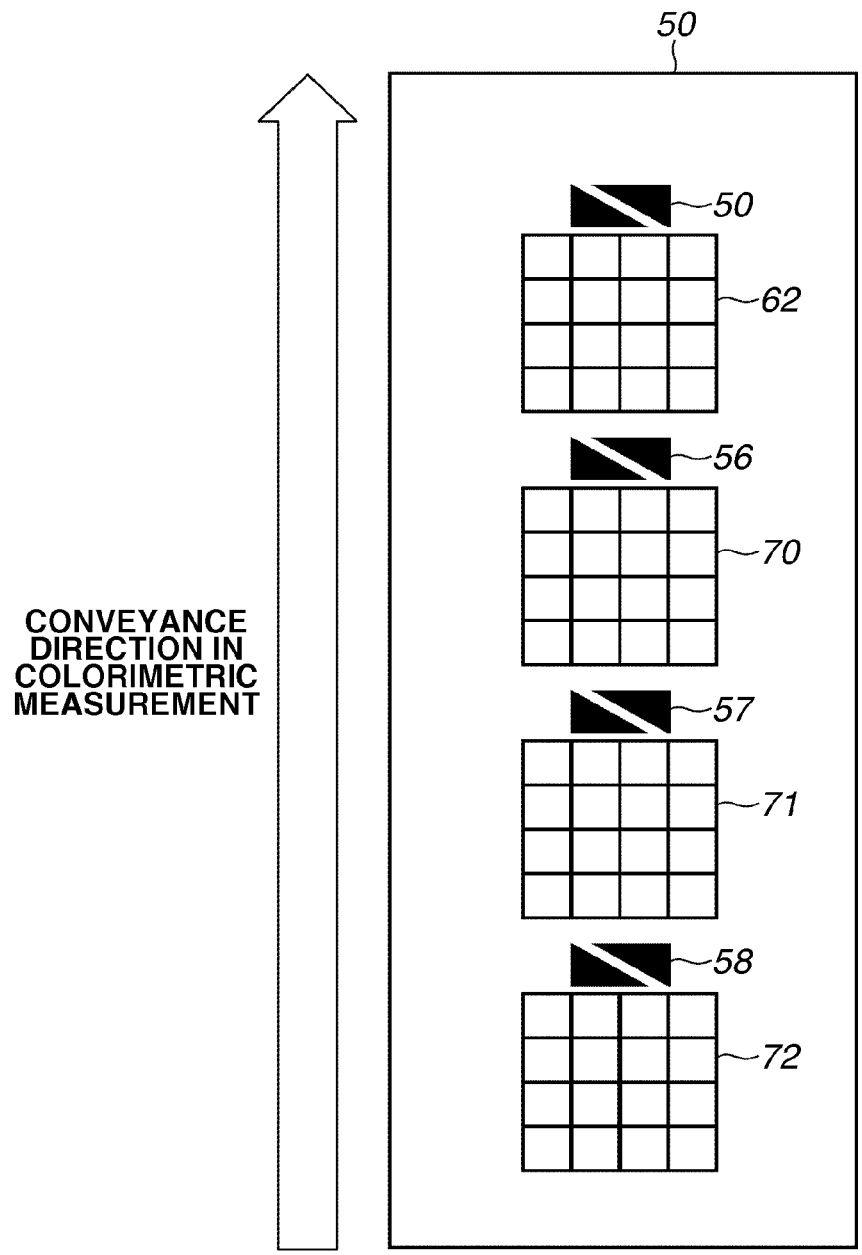
FIG. 7 illustrates a layout of POS bars and color patches.

A case where a wedge is long in the conveyance direction of the recording medium is described. In a case where only one POS bar is provided for a wedge long in the conveyance direction, a first color patch array can be accurately stopped with respect to the colorimetric sensor. However, if the colorimetric measurement of color patch arrays is sequentially performed by repeating the conveyance by a predetermined distance and the colorimetric measurement, conveyance errors may be accumulated and cause skip in reading of the color patch arrays. Therefore, if a length of a color patch in the conveyance direction is longer than a predetermined length, a POS bar is inserted for each predetermined number of patch arrays at a position in the middle of the conveyance direction. FIG. 7 illustrates an example of the layout. In FIG. 7, POS bars 50, 56, 57, and 58 are respectively recorded at the downstream side of color patch array groups 62, 70, 71, and 72 each of which includes a plurality of color patch arrays in the conveyance direction in the colorimetric measurement.

The insertion of the POS bar for each predetermined number of patch arrays can be automatically performed. Alternatively, an announcement of a possibility of skip in reading may be made for a user to select whether to perform the insertion via display on an operation panel, a PC screen, or the like.

According to the above-described first exemplary embodiment, for correcting a conveyance error in colorimetric measurement, the method for providing a POS bar near each wedge in the downstream in the colorimetric conveyance direction is described. Alternatively, a second exemplary embodiment may be provided in which a POS bar is provided near each of both upstream and downstream sides of color patch arrays or one side of color patch arrays in a colorimetric sensor scanning direction. A basic configuration of the second exemplary embodiment is similar to that in the above-described first exemplary embodiment, and thus, different points are described below.

First, a case where POS bars are provided on both of an upstream side and a downstream side of color patch arrays in the colorimetric sensor scanning direction is described.

Figure 8:
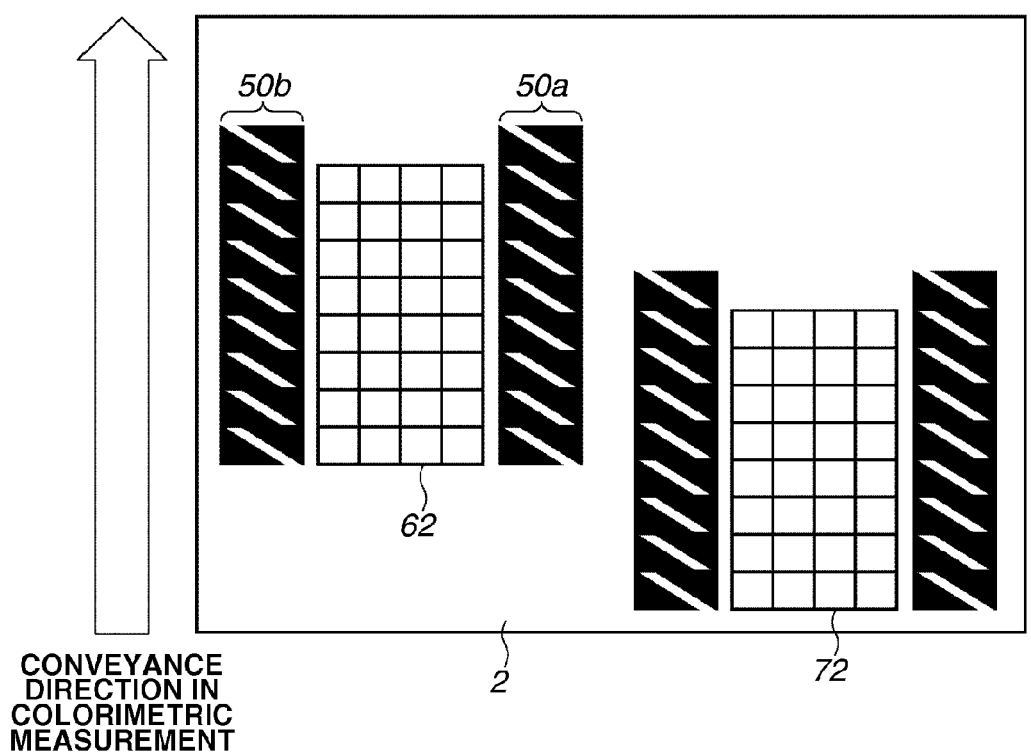
FIG. 8 illustrates a layout of POS bars and color patches.

FIG. 8 illustrates a layout of POS bars and color patches. Wedges 62 and 72 respectively include a plurality of color patch arrays. A POS bar group 50a is recorded at the upstream side of the color patch arrays in the colorimetric sensor scanning direction. A POS bar group 50b is recorded at the downstream side of the color patch arrays. The POS bars are disposed near each color patch at the upstream and downstream of the color patch in the colorimetric sensor scanning direction. The densities of the POS bars on the upstream and downstream sides are detected, an average value of deviation amounts of the both detected densities is calculated, and the deviation amount is corrected when a next color patch array is conveyed. Accordingly, the optimum correction can be performed for each color patch array.

Figure 9:
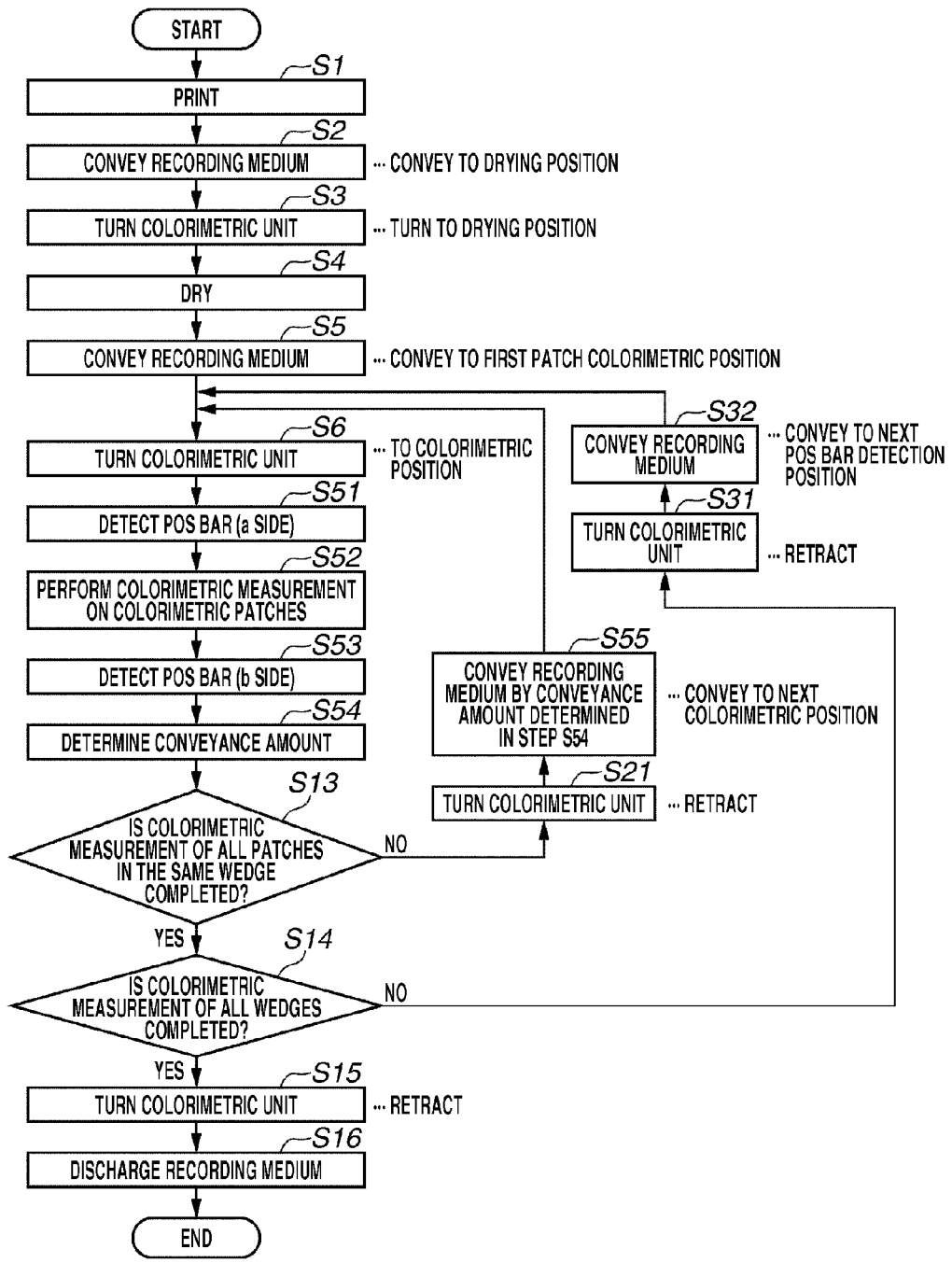
FIG. 9 is a flowchart illustrating a control operation.

FIG. 9 is a flowchart illustrating the control operation. The processes from step S1 to step S4 are similar to those in the first exemplary embodiment, and in step S5, the recording medium is conveyed to a first patch colorimetric position. In step S6, the colorimetric unit is turned to the colorimetric position. In steps S51 to 53, the colorimetric carriage is moved and the upstream POS bar detection, the colorimetric measurement of color patches, and the downstream POS bar detection are performed.

In step S54, based on the upstream and downstream POS bar detection, a conveyance amount including a correction value is determined. If the colorimetric measurement of all patches within the same wedge is not completed (NO in step S13), then in step S21, the colorimetric unit is retracted. In step S55, the recording medium is conveyed to a next colorimetric position by the conveyance amount determined in step S54. Accordingly, the conveyance amount correction can be performed for each patch array, and as a result, the colorimetric operation can be performed without skipping in reading of the color patch arrays. In addition, a usage amount of the recording medium can be reduced by reducing the color patch size to a minimum size. Further, also in the processes, the user can select whether to correct the conveyance amount.

Figure 10:
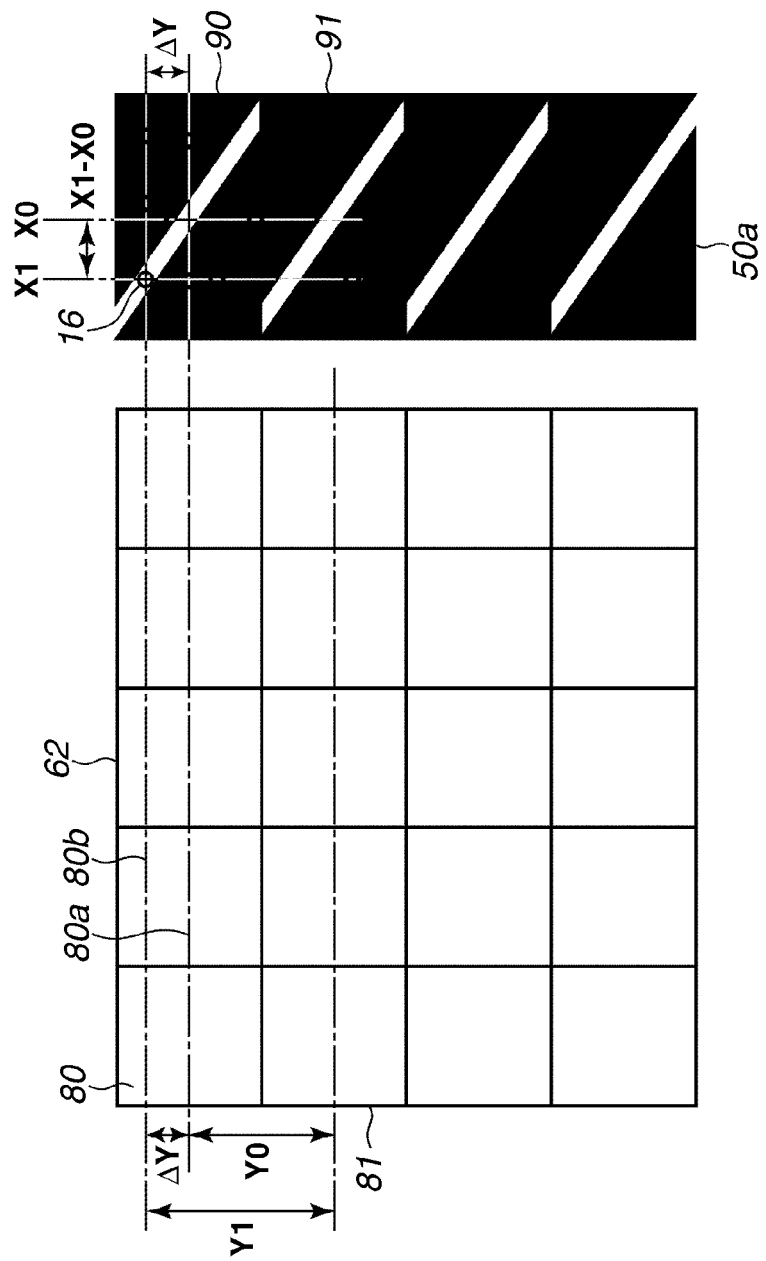
FIG. 10 illustrates a procedure for obtaining a conveyance distance with a POS bar recorded in the same row as a color patch array.

With reference to FIG. 10, a procedure for obtaining a conveyance distance with a POS bar which is recorded in the same row as a color patch array and on an upstream side in the colorimetric sensor scanning direction with respect to the color patch array is described. A POS bar 90 is recorded on an upstream side in the colorimetric sensor scanning direction of a color patch array 80 in a wedge 62. For the sake of simplicity, in FIG. 10, a POS bar on a downstream side of the colorimetric sensor scanning direction is omitted.

It is assumed that a position where the colorimetric sensor 16 has stopped to perform colorimetric measurement on the color patch array 80 deviates from an ideal position by $\Delta Y$. The colorimetric sensor 16 performs scanning over a line 80b deviating from an ideal scanning line 80a by $\Delta Y$ to the downstream side in the conveyance direction in the colorimetric measurement. On the POS bar 90, a measurement density is the lowest at a position X1. Similarly to the case described based on FIG. 5, $\Delta Y$ can be calculated by the equation $\Delta Y=(X1-X0)\times\tan\alpha$. Further, it is assumed that a deviation similarly calculated using the POS bar recorded at the downstream side in the colorimetric sensor scanning direction is $\Delta Y2$. A distance Y1 for conveying the recording medium to perform the colorimetric measurement on a next color patch array 81 adjacent to the color patch array 80 can be calculated by an equation $Y1=Y0+(\Delta Y+\Delta Y2)\times\frac{1}{2}$. Similarly a distance for conveying the recording medium to perform the colorimetric measurement on a next color patch array can be obtained by POS bar 91.

Figure 11:
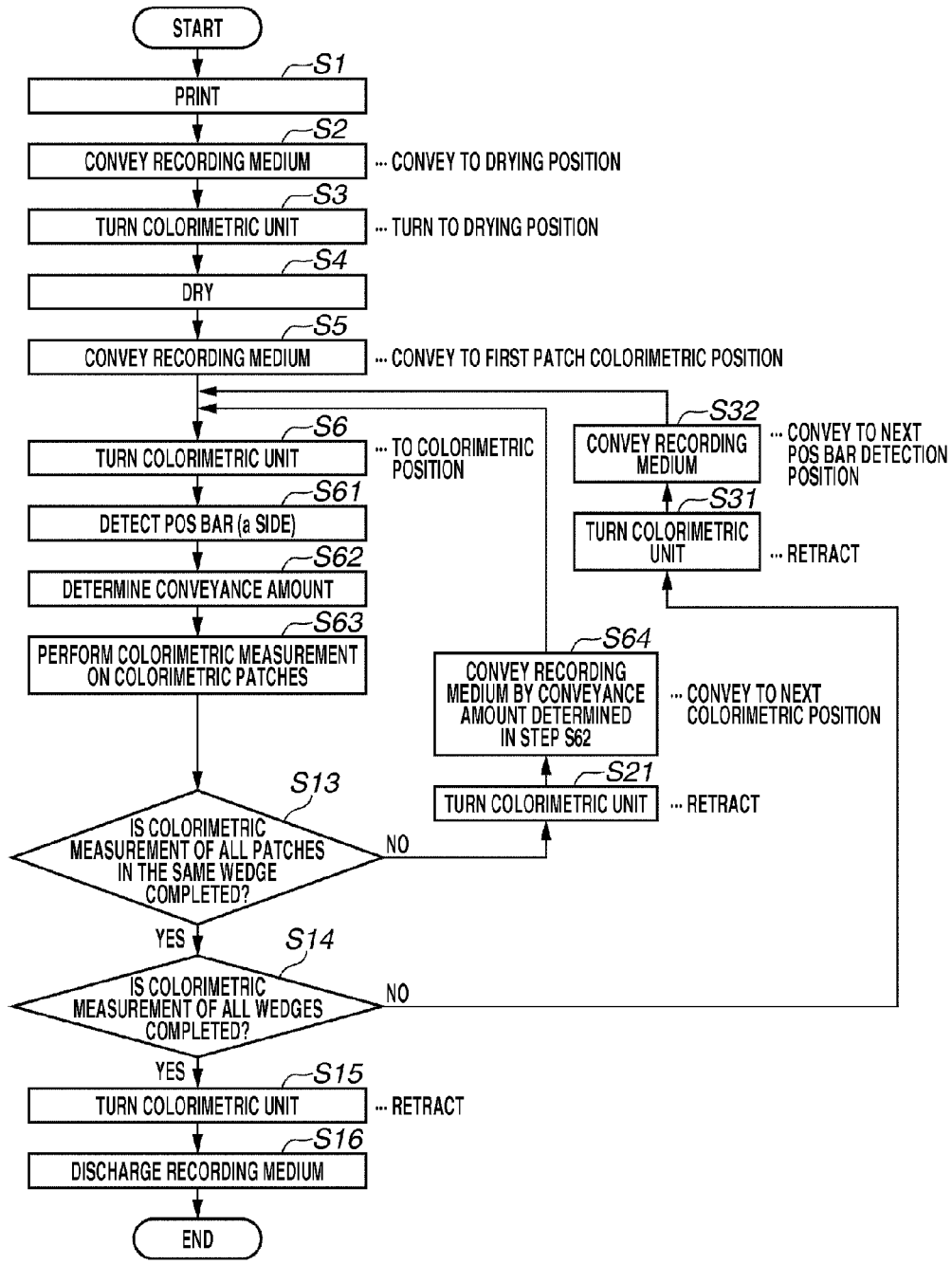
FIG. 11 is a flowchart illustrating a control operation.

With reference to FIG. 11, a case where a POS bar is provided only on an upstream side of color patch arrays in the colorimetric sensor scanning direction is described. FIG. 11 is a flowchart illustrating a control operation. Differences from the flowchart in FIG. 9 are described.

In step S61, the POS bar on the upstream side is detected. In step S62, a conveyance amount to a next patch array is determined which is obtained by correcting a deviation amount obtained in the detection in step S61. Similarly to the case described in FIG. 10, $\Delta Y$ can be calculated by the equation $\Delta Y=(X1-X0)\times\tan\alpha$. The distance Y1 for conveying the recording medium for the colorimetric measurement of a next color patch array 81 can be calculated by the equation $Y1=Y0+\Delta Y$. In step S63, the colorimetric measurement of the color patch is performed. In step S64, the recording medium is conveyed by the conveyance amount determined in step S62.

Figure 12:
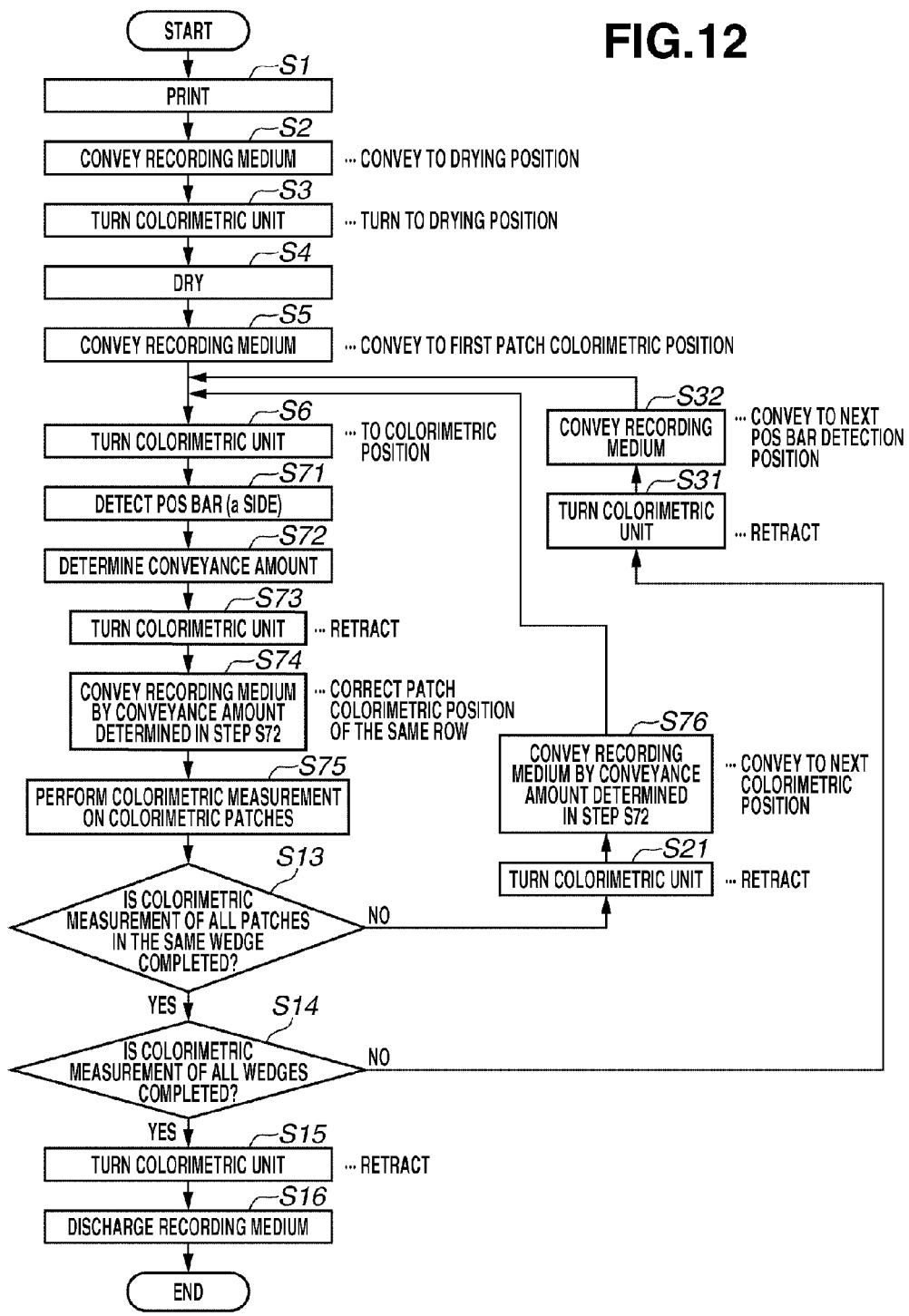
FIG. 12 is a flowchart illustrating a control operation.

If the POS bar is provided only on the upstream side of the color patch arrays in the colorimetric sensor scanning direction, a method described below may be used. FIG. 12 is a flowchart illustrating a control operation. Differences from the flowchart in FIG. 11 are described below.

In step S71, the POS bar on the upstream side is detected. In step S72, based on the deviation amount calculated in the detection in step S71, a conveyance amount to the optimum colorimetric position within the same patch array is determined, and a conveyance amount to a next patch array and subsequent arrays is also determined. In other words, if the detection result in step S71 is similar to that described with reference to FIG. 10, the conveyance amount to the optimum colorimetric position 80a within the same patch array can be calculated by the equation $\Delta Y=(X1-X0)\times\tan\alpha$.

In step S73, the colorimetric unit is retracted. In step S74, the recording medium is conveyed by the conveyance amount $\Delta Y$ determined in step S72. Accordingly, the positional relationship between the color patches and the colorimetric sensor is optimized, and in step S75, the colorimetric unit is turned and the colorimetric measurement can be performed.

If the colorimetric measurement of all patches within the same wedge is not completed (NO in step S13), then in step S21, the colorimetric unit is retracted. In step S76, the recording medium is conveyed to a next colorimetric position by the conveyance amount determined in step S72. In the conveyance in step S76, the conveyance starts from the position 80a in FIG. 10, and thus, the conveyance distance is Y0.

In the description, the method for determining the two conveyance amounts in step S72 is described. Alternatively, one of the two conveyance amounts may be determined and only the conveyance adjustment within the same patch array or only the conveyance correction between the color patch arrays may be performed.

Figure 13:
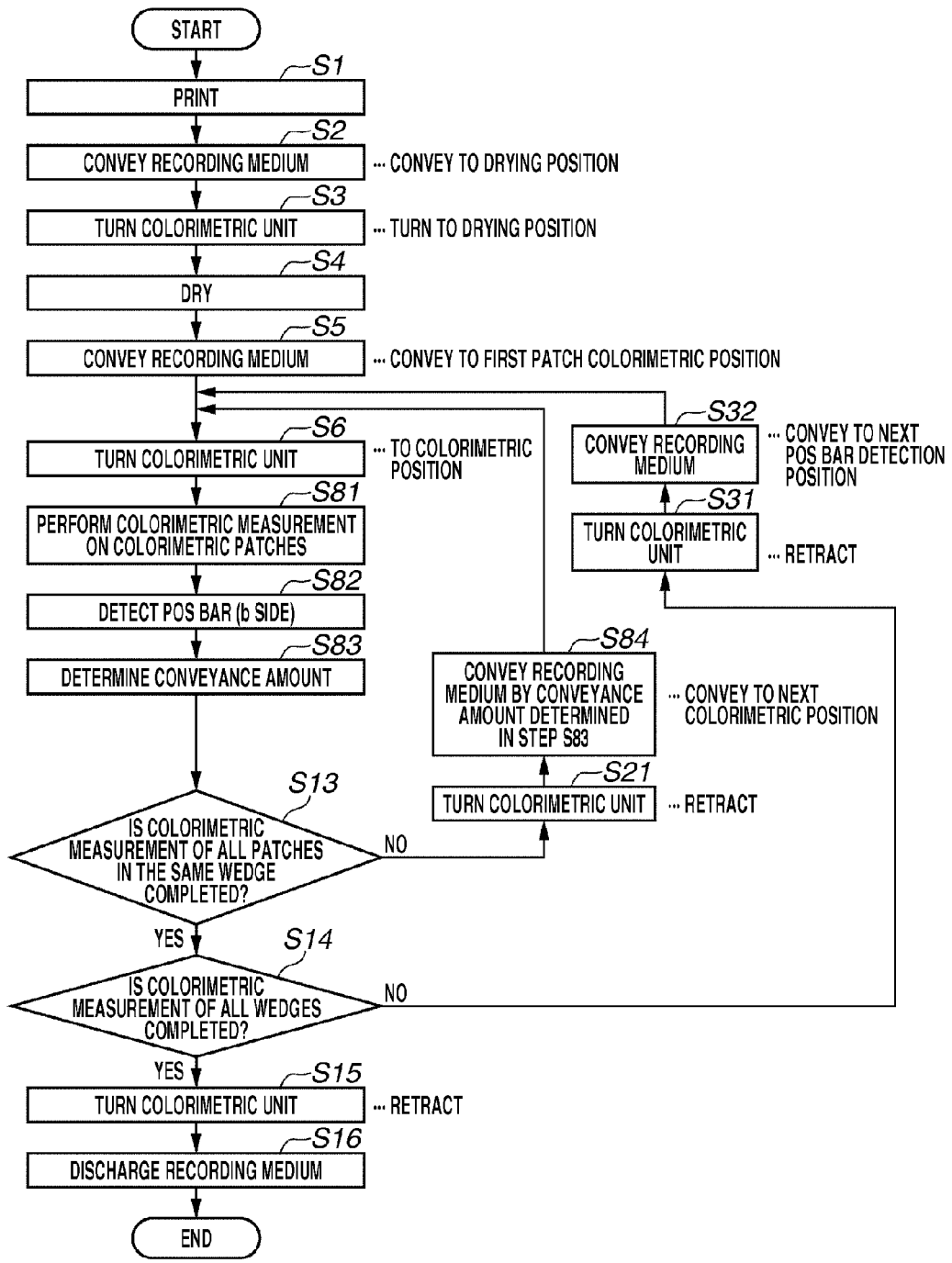
FIG. 13 is a flowchart illustrating a control operation.

With reference to FIG. 13, a case where a POS bar is provided only on a downstream side of color patch arrays in the colorimetric sensor scanning direction is described.

FIG. 13 is a flowchart illustrating a control operation. Differences from the flowchart in FIG. 11 are as follows. In step S82, the POS bar on the downstream side is detected. In step S83, a conveyance amount to a next patch array, which is obtained by correcting the deviation amount obtained in the detection in step S82, is determined. Further, in step S84, the recording medium is conveyed by the conveyance amount determined in step S83. Accordingly, the conveyance correction between the color patch arrays can be performed.

Figure 14:
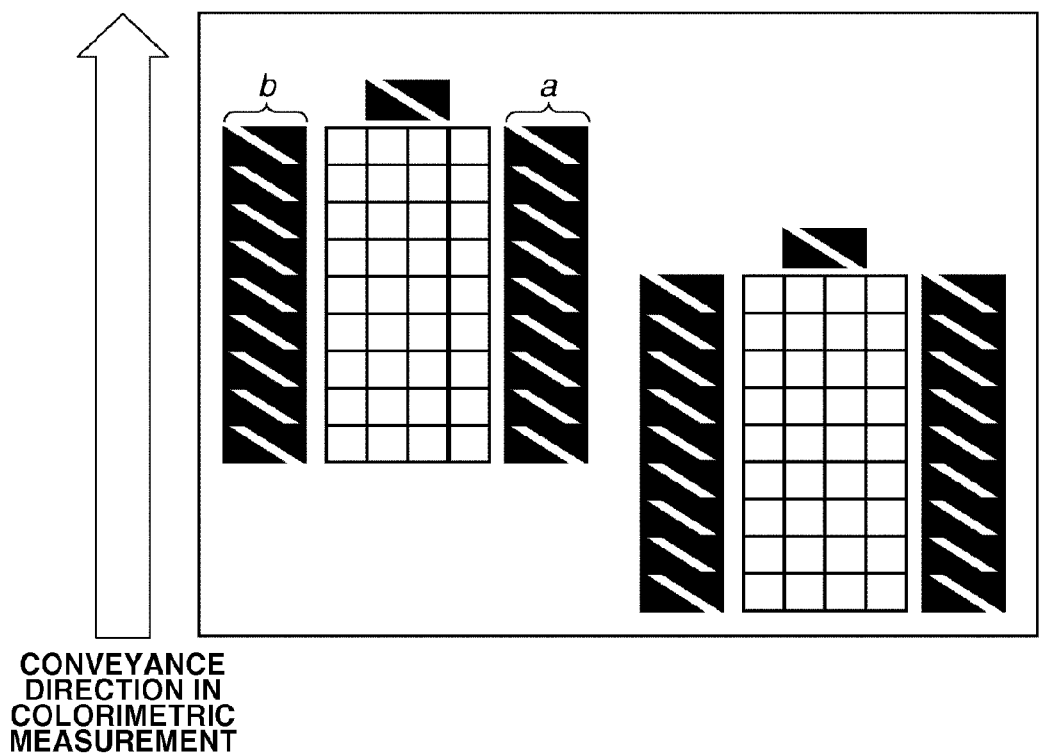
FIG. 14 illustrates a layout of POS bars and color patches.

According to the above-described exemplary embodiments, the method for providing a POS bar near the downstream side of each wedge in the conveyance direction in the colorimetric measurement and the method for providing a POS bar near color patch arrays in the colorimetric sensor scanning direction are separately described as the methods for correcting a conveyance error in colorimetric measurement. Alternatively, a third exemplary embodiment may be provided in which both of POS bars provided in the same rows as color patch arrays, and a POS bar that is a second position information pattern provided on the downstream side of a patch group in the conveyance direction in the colorimetric measurement are provided, as illustrated in a layout of POS bars and color patches in FIG. 14. A basic configuration of the third exemplary embodiment is similar to those in the above-described exemplary embodiments, and thus, different points are described below.

Figures 15, 15A, 15B:
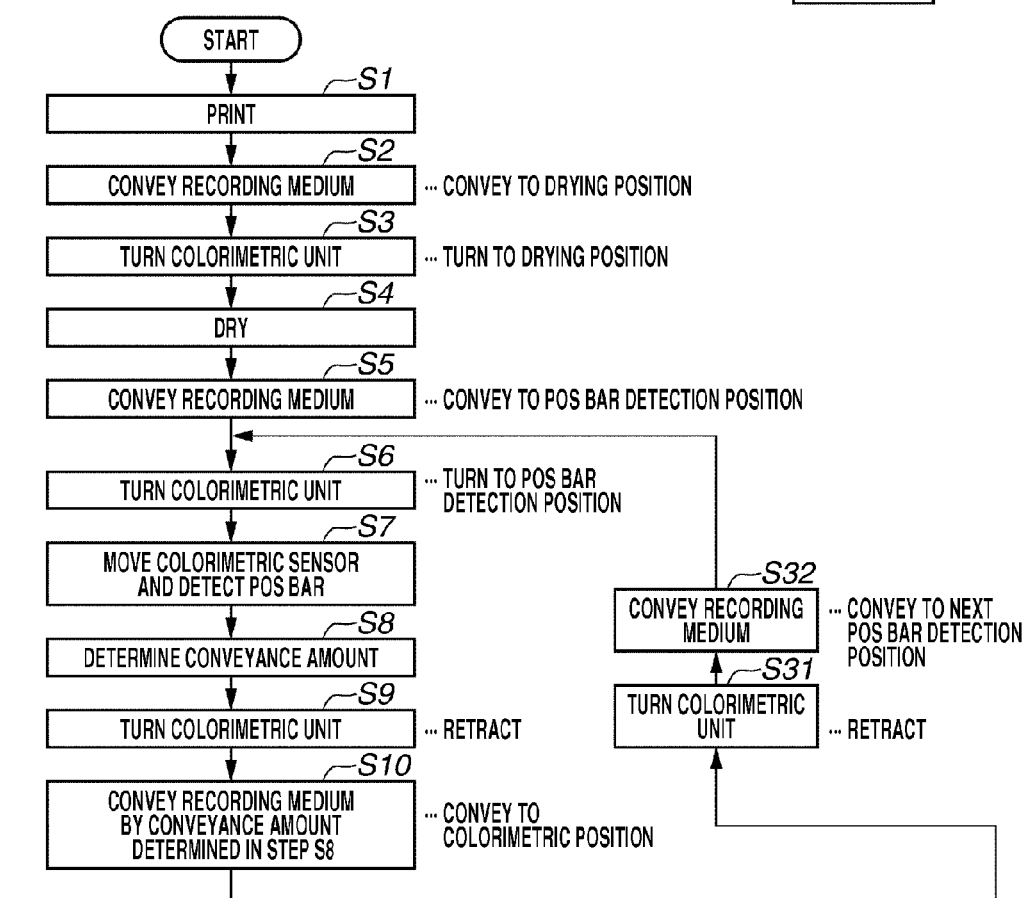
FIG. 15 (including FIGS. 15A and 15B) is a flowchart illustrating a control operation.
Figure 15B:
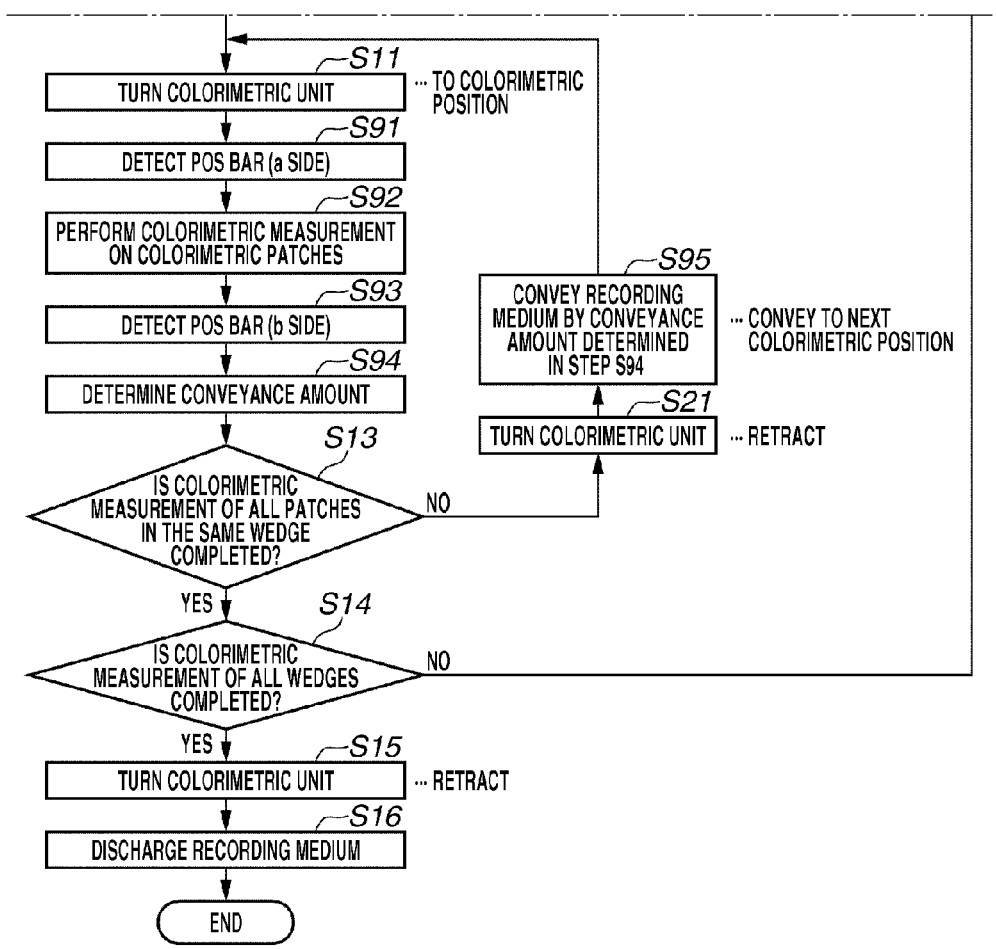

FIG. 15 (including FIGS. 15A and 15B) is a flowchart illustrating a control operation. The processes in steps S1 to S11 are similar to those in FIG. 3. In steps S91 to 93, the colorimetric carriage is moved and the upstream POS bar detection, the colorimetric measurement of color patches, and the downstream POS bar detection are performed.

In step S94, based on the upstream and downstream POS bar detection, a conveyance amount including a correction value is determined. If the colorimetric measurement of all patches within the same wedge is not completed (NO in step S13), then in step S21, the colorimetric unit is retracted. In step S95, the recording medium is conveyed to a next colorimetric position by the conveyance amount determined in step S94.

Accordingly, the conveyance amount correction can be performed for each patch array, and as a result, the colorimetric operation can be performed without skipping in reading of the color patch arrays. In addition, a usage amount of the recording medium can be reduced by reducing the color patch size to a minimum size. According to the present exemplary embodiment, the method for providing POS bars for color patch arrays in the colorimetric sensor scanning direction near the upstream and downstream sides is described. Alternatively, similarly to the above-described exemplary embodiment, the POS bar can be provided only on the upstream side or the downstream side.

According to the above-described exemplary embodiments, color patches can be conveyed to a position where the colorimetric unit performs the colorimetric measurement at a high accuracy.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-257430 filed Nov. 25, 2011, which is hereby incorporated by reference herein in its entirety.

What is claimed is:

1. A method comprising:
   recording on a sheet an array of color patches and positioning patterns in a vicinity of the array of the color patches;
   moving a sensor with a carriage in a scanning direction intersecting with a conveyance direction of the sheet to read the positioning patterns recorded on the sheet;
   moving the sensor with the carriage in the scanning direction to position the sensor on each of the color patches recorded on the sheet based on a reading result of the positioning patterns with the sensor; and
   performing colorimetric measurement of each of the color patches with the sensor,
   wherein the positioning patterns are recorded on both sides of the array of the color patches intersecting with the scanning direction and on a downstream side of the array of the color patches in the conveyance direction, and
   each of the positioning patterns has two triangle portions arranged such that a hypotenuse of each triangle portions faces each to form an inclined slit mark between the two hypotenuses, and the inclined slit mark is detected with the sensor.

2. The method according to claim 1, wherein the positioning is performed by conveying the sheet in the conveyance direction of the sheet, based on the reading result of the positioning patterns recorded on the downstream side of the array of the color patches in the conveyance direction.

3. The method according to claim 1, wherein the inclined slit mark is inclined with respect to the scanning direction and the conveyance direction and has lower density than that of the triangle portions.

4. The method according to claim 1, wherein a plurality of the arrays of the color patches are recorded on the sheet, and each of the positioning patterns is recorded corresponding to each for the groups.

5. The method according to claim 1, wherein the positioning is performed by moving the sensor in the scanning direction, based on the reading results of the positioning patterns recorded on the both sides of the array of the color patches in the scanning direction.

6. A colorimetric measurement apparatus comprising:
   a conveyance unit configured to convey a sheet in a conveyance direction; and
   a colorimetric unit, having a sensor and a carriage mounting the sensor for scanning in a scanning direction intersecting with the conveyance direction, configured to perform colorimetric measurement of color patches recorded on the sheet,
   a control unit configured to perform controlling of the apparatus such that:
      moving the carriage in the scanning direction to read with the sensor positioning patterns recorded in a vicinity of the color patches on the sheet;
      moving the carriage in the scanning direction to position the sensor on each of the color patches recorded the sheet based on a reading result of the positioning patterns with the sensor; and
      performing colorimetric measurement of each of the color patches with the sensor,
   wherein the positioning patterns are recorded on both sides of the color patches in the scanning direction and on a downstream side of the color patches in the conveyance direction, and
   each of the positioning patterns has two triangle portions arranged such that a hypotenuse of each triangle portions faces each to form an inclined slit mark between the two hypotenuses, and the inclined slit mark is detected with the sensor.

7. A recording apparatus comprising:
   a recording unit configured to perform recording on a sheet; and
   a colorimetric apparatus according to claim 6,
   wherein a pattern and a color patch are recorded by the recording unit.

8. The apparatus according to claim 6, wherein the positioning is performed by conveying the sheet in the conveyance direction with the conveyance unit, based on the reading result of the positioning patterns recorded on a side of the array of the color patches in the conveyance direction.

9. The apparatus according to claim 6, wherein the positioning is performed by moving the sensor in the scanning direction with the carriage, based on the reading result of the positioning patterns recorded on the both sides of the array of the color patches in the scanning direction.

10. The apparatus according to claim 6, wherein the inclined slit mark is inclined with respect to the conveyance direction of the sheet and has lower density than that of the triangle portions.

* * * * *